J. A. GRANSTROM.
INDICATOR FOR GARAGES, ETC.
APPLICATION FILED APR. 27, 1921.

1,410,292. Patented Mar. 21, 1922.

INVENTOR
J. A. Granstrom
ATTORNEYS

UNITED STATES PATENT OFFICE.

JOHN A. GRANSTROM, OF BOSTON, MASSACHUSETTS.

INDICATOR FOR GARAGES, ETC.

1,410,292. Specification of Letters Patent. Patented Mar. 21, 1922.

Application filed April 27, 1921. Serial No. 465,057.

*To all whom it may concern:*

Be it known that I, JOHN A. GRANSTROM, a citizen of the United States, residing at Boston, in the county of Suffolk and State of Massachusetts, have invented new and useful Improvements in Indicators for Garages, Etc., of which the following is a specification.

This invention has for its object to provide an indicator adapted to register the number of vehicles passing in opposite directions over a floor or track, and to separately register the number passing in each of two opposite directions, the chief object being to provide an indicator organized to cooperate with wheels of vehicles entering and leaving a garage, to register the number of incoming and the number of outgoing vehicles.

The invention is embodied in the improvements which I will now proceed to describe and claim.

Of the accompanying drawings forming a part of this specification,—

The same reference characters indicate the same parts in all of the figures.

An element of my improved indicator is provided by an elongated bar, preferably of iron or steel, having an elongated impact edge 12, adapted to be moved laterally by the impact of a vehicle wheel 13 moving crosswise of said edge. The bar is supported by means providing a horizontal axis parallel with and spaced from the impact edge, said means being preferably embodied in trunnions 14, projecting from opposite ends of the bar, and fixed bearings 15 in which said trunnions are journaled.

Figure 2:
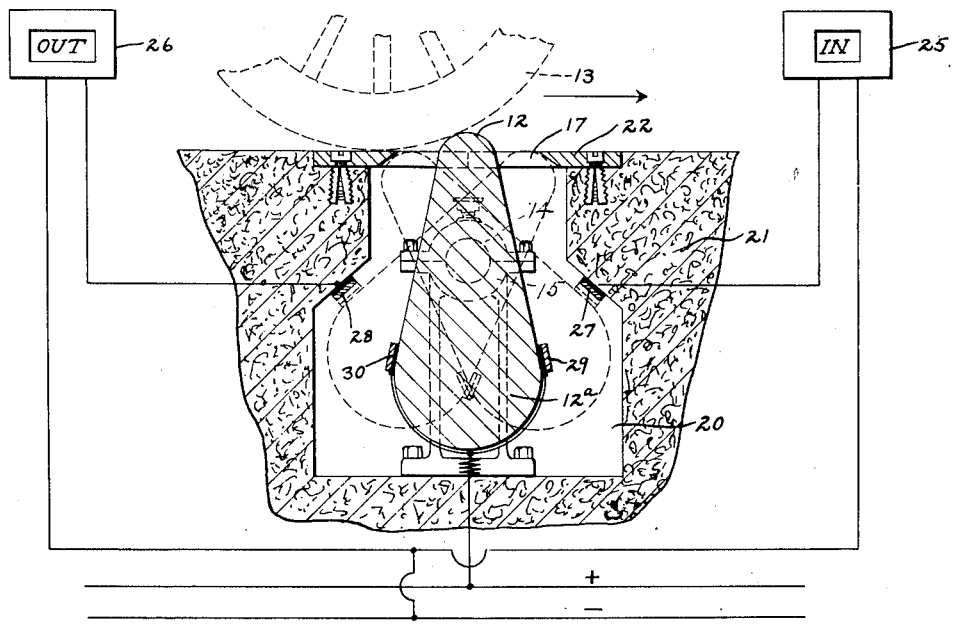
Figure 2 is a section on line 2—2 of Figure 1, showing diagrammatically elements completing the indicator.
Figure 3:
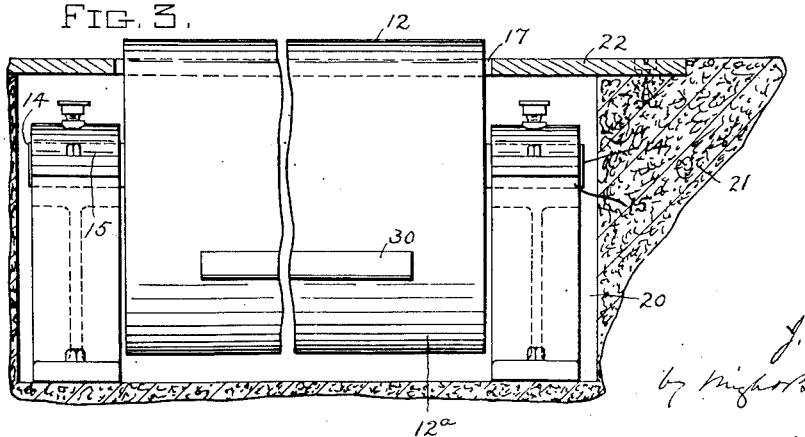
Figure 3 is a section on line 3—3 of Figure 1.

The bar has a weighted portion 12ᵃ normally holding the impact edge 12 in a central position above said axis, as shown by full lines in Figure 2, said weighted portion being at the opposite side of the axis from the impact edge 12.

A housing for said bar is provided having a slot 17 through which the impact edge 12 normally projects, and in which it is laterally movable in either direction from its normal position, as indicated by dotted lines in Figure 2.

As here shown, the housing and slot are provided by a chamber 20, formed in a concrete floor or base 21, and by an opening in a metal plate 22, secured to said floor, the bearings 14 being supported by standards fixed to the bottom of said chamber. The chamber 20 is extended below the axis of the bar and is formed to permit oscillation of the weighted portion 12ᵃ.

It will now be seen that a wheel 13 moving in the direction of the arrow in Figure 2, will swing the impact edge to the right-hand dotted line position, and that a wheel moving in the opposite direction will swing the impact edge to the left-hand dotted line position. The movements of the bar thus caused may be utilized in any suitable way to register the number of wheels passing over the bar.

In Figure 2 I have shown diagrammatically a pair of registers 25 and 26, which may be of any suitable construction adapted to be operated by the alternate closing and breaking of an electric circuit.

The housing is provided with two fixed electrodes 27 and 28, and the bar is provided below its axis with two electrodes 29 and 30.

Figure 1:
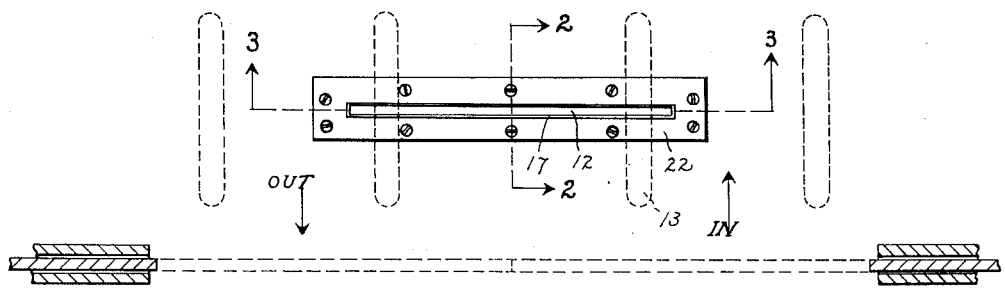
Figure 1 is a top plan view of a portion of a garage floor provided with elements of indicating means embodying the invention.

The registers and electrodes are electrically connected as shown by the diagram of Figure 2, and the arrangement is such that when the impact edge 12 is moved to the right-hand position shown by Figure 1, the electrode 30 makes contact with the fixed electrode 28, and the register 26 is actuated. When the impact edge is moved to the left-hand position, the electrode 29 makes contact with the fixed electrode 27, and the register 25 is actuated.

Any other suitable registers operable by the described movements of the bar may be employed.

I claim:

In an indicator of the character stated, in combination, a fixed housing having a top surface forming a portion of a floor, and provided with an oblong slot and with a chamber below said slot, a bar having a weighted lower portion and an upper portion having an impact edge, said chamber being extended downwardly from its top surface to permit the oscillation of said weighted portion, bar-supporting means within the housing providing a bar axis parallel with the impact edge and with the longitudinal edges of the slot and above the said weighted portion, the arrangement being such that the impact edge is adapted to swing in the arc of a circle, and is normally held by said weighted portion above the said top surface, and spaced from the longitudinal edges of the slot, so that said impact edge may be swung downwardly, toward either longitudinal slot edge by a wheel moving over said surface, and registering means operable by a movement of the impact edge in each direction, to register vehicles passing in and out over said top surface.

In testimony whereof I have affixed my signature.

JOHN A. GRANSTROM.